(12) United States Patent
Buxton

(10) Patent No.: US 9,010,009 B2
(45) Date of Patent: Apr. 21, 2015

(54) ECCENTRIC RAIL NUT AND ECCENTRIC RAIL MOUNTING SYSTEM

(75) Inventor: Steven C. Buxton, Turin, NY (US)

(73) Assignee: The Otis Patent Trust, Lyons Falls, NY (US)

( * ) Notice: Subject to any disclaimer, the term of this patent is extended or adjusted under 35 U.S.C. 154(b) by 499 days.

(21) Appl. No.: 13/286,285

(22) Filed: Nov. 1, 2011

(65) Prior Publication Data

US 2012/0102805 A1 May 3, 2012

Related U.S. Application Data

(60) Provisional application No. 61/408,918, filed on Nov. 1, 2010.

(51) Int. Cl.
| | | |
|---|---|---|
| *F41A 15/00* | (2006.01) | |
| *F41G 11/00* | (2006.01) | |
| *F16B 37/04* | (2006.01) | |
| *F41A 21/48* | (2006.01) | |
| *F41C 23/16* | (2006.01) | |

(52) U.S. Cl.
CPC ............ *F41G 11/003* (2013.01); *F16B 37/047* (2013.01); *F41A 21/482* (2013.01); *F41C 23/16* (2013.01)

(58) Field of Classification Search
CPC .................................................... F41G 11/003
USPC ................ 42/90, 71.01, 72, 75.02; 89/191.01
See application file for complete search history.

(56) References Cited

U.S. PATENT DOCUMENTS

| | | | | |
|---|---|---|---|---|
| 1,580,968 | A * | 4/1926 | Di Brazzá ................... | 42/75.02 |
| 4,765,224 | A * | 8/1988 | Morris ..................... | 89/191.01 |
| 4,930,399 | A * | 6/1990 | Trevor, Jr. ................ | 89/191.02 |
| 5,247,758 | A * | 9/1993 | Mason ...................... | 42/75.02 |
| 5,412,895 | A * | 5/1995 | Krieger .................... | 42/75.02 |
| 5,590,484 | A * | 1/1997 | Mooney et al. ............. | 42/111 |
| 6,499,245 | B1 * | 12/2002 | Swan ....................... | 42/71.01 |
| 6,671,990 | B1 * | 1/2004 | Booth ...................... | 42/75.01 |
| 6,959,509 | B2 * | 11/2005 | Vais ....................... | 42/75.02 |
| 7,216,451 | B1 * | 5/2007 | Troy ....................... | 42/72 |
| 7,451,564 | B2 * | 11/2008 | Wait ....................... | 42/75.02 |
| 7,640,689 | B2 * | 1/2010 | Fluhr ...................... | 42/75.01 |
| 7,716,865 | B2 * | 5/2010 | Daniel et al. .............. | 42/75.02 |
| 7,748,154 | B2 * | 7/2010 | Moretti .................... | 42/75.03 |
| 7,827,722 | B1 * | 11/2010 | Davies ..................... | 42/75.02 |
| 7,905,041 | B1 * | 3/2011 | Davies ..................... | 42/75.02 |
| 7,975,417 | B2 * | 7/2011 | Duplessis et al. ........... | 42/16 |
| 8,069,604 | B2 * | 12/2011 | Larue ...................... | 42/75.1 |
| 8,141,289 | B2 * | 3/2012 | Gomez et al. ............... | 42/90 |
| 8,205,373 | B1 * | 6/2012 | Ubl et al. ................. | 42/71.01 |
| 8,230,633 | B1 * | 7/2012 | Sisk ....................... | 42/75.01 |
| 8,276,303 | B2 * | 10/2012 | Kapusta et al. ............. | 42/71.01 |
| 8,359,779 | B2 * | 1/2013 | Daniel et al. .............. | 42/75.03 |
| 8,397,419 | B2 * | 3/2013 | Williams ................... | 42/90 |
| 8,443,711 | B2 * | 5/2013 | Clark et al. ............... | 89/193 |
| 8,453,364 | B2 * | 6/2013 | Kucynko .................... | 42/71.01 |
| 8,539,708 | B2 * | 9/2013 | Kenney et al. .............. | 42/75.02 |
| 2004/0049964 | A1 * | 3/2004 | Vais ....................... | 42/75.02 |

(Continued)

*Primary Examiner* — Michelle R Clement
(74) *Attorney, Agent, or Firm* — Harris Beach PLLC

(57) ABSTRACT

An eccentric rail mounting system is disclosed. In various embodiments, this system comprises an eccentric rail nut for off-center mounting of a rail on a firearm. The eccentric rail nut has an exterior surface that defines a central axis of the nut and a main bore that defines a central axis of the main bore that is displaced from the central axis of the nut. Components and methods are disclosed in a variety of embodiments.

12 Claims, 4 Drawing Sheets

(56) References Cited

U.S. PATENT DOCUMENTS

| | | | |
|---|---|---|---|
| 2007/0017139 A1* | 1/2007 | Larue | 42/75.1 |
| 2007/0186458 A1* | 8/2007 | Wait | 42/75.02 |
| 2008/0092422 A1* | 4/2008 | Daniel et al. | 42/90 |
| 2009/0013579 A1* | 1/2009 | Fluhr | 42/71.01 |
| 2010/0319528 A1* | 12/2010 | Kenney et al. | 89/193 |
| 2011/0061281 A1* | 3/2011 | Kapusta et al. | 42/71.01 |
| 2011/0167701 A1* | 7/2011 | Williams | 42/90 |
| 2011/0192066 A1* | 8/2011 | Kimmel et al. | 42/71.01 |
| 2011/0265640 A1* | 11/2011 | Kuczynko et al. | 89/193 |
| 2012/0137563 A1* | 6/2012 | Ubl et al. | 42/75.03 |
| 2012/0144713 A1* | 6/2012 | Dubois | 42/50 |
| 2012/0216439 A1* | 8/2012 | Barrett et al. | 42/75.02 |
| 2012/0291329 A1* | 11/2012 | Ubl et al. | 42/71.01 |
| 2013/0036648 A1* | 2/2013 | Shipman et al. | 42/108 |
| 2013/0047832 A1* | 2/2013 | Hochstrate et al. | 89/191.01 |
| 2013/0055613 A1* | 3/2013 | Gomez et al. | 42/90 |
| 2013/0180151 A1* | 7/2013 | Moore | 42/90 |
| 2013/0284008 A1* | 10/2013 | Pizano | 89/193 |
| 2014/0026459 A1* | 1/2014 | Yan et al. | 42/71.01 |
| 2014/0033590 A1* | 2/2014 | Gomez | 42/75.02 |

* cited by examiner

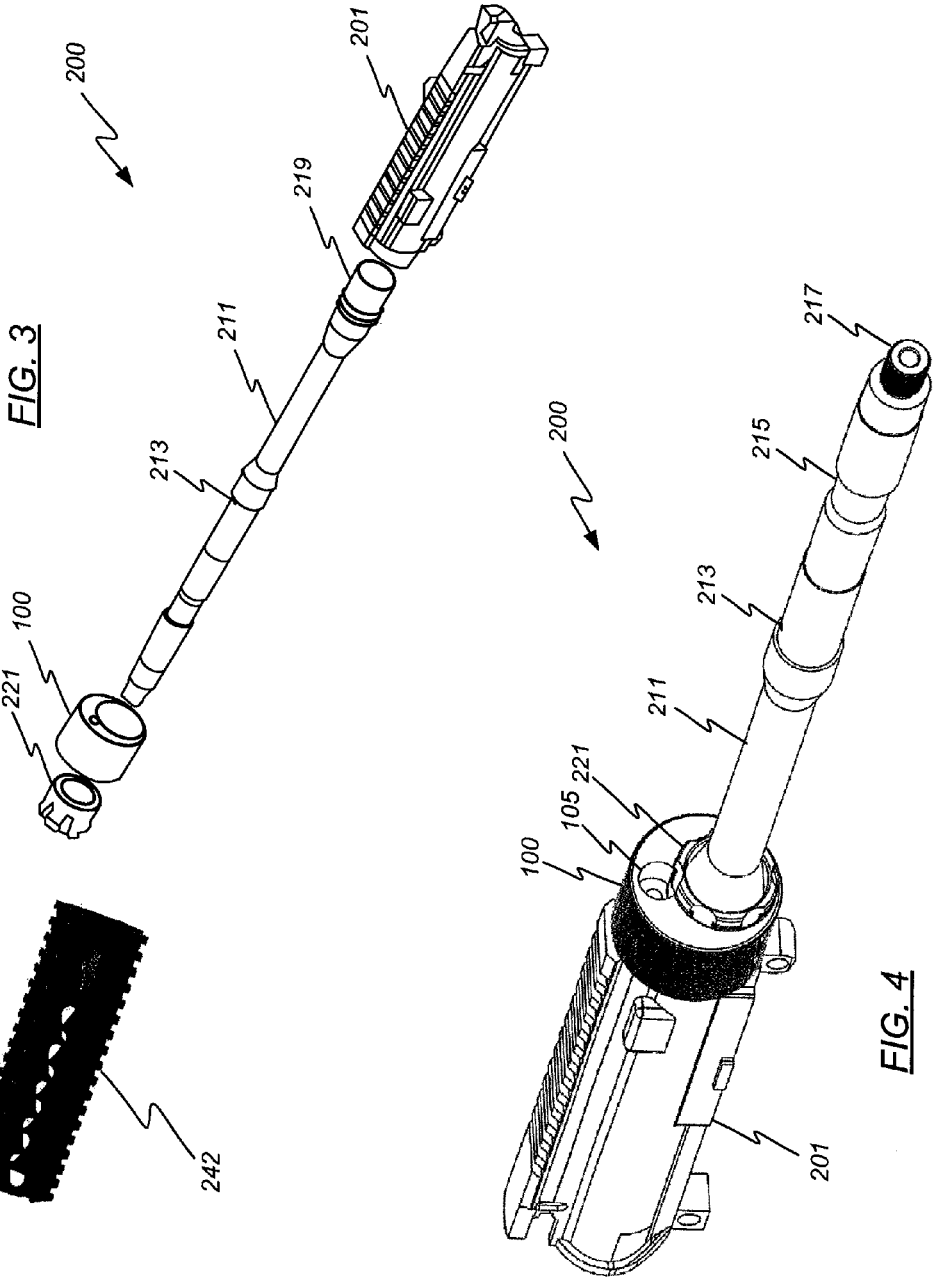

ECCENTRIC RAIL NUT AND ECCENTRIC RAIL MOUNTING SYSTEM

CROSS-REFERENCE TO RELATED APPLICATIONS

This application claims priority to and the benefit of U.S. provisional patent application Ser. No. 61/408,918, entitled "Eccentric Rail Nut and Eccentric Rail Mounting System," filed Nov. 1, 2010, which is incorporated herein by reference in its entirety.

TECHNICAL FIELD

The present disclosure relates generally to a rail nut for mounting a rail on a firearm, for example.

BACKGROUND OF THE INVENTION

Rails may serve as useful handguard and mounting systems for firearms. For example, a Picatinny rail, i.e. a MIL-STD-1913 rail, may be installed on an AR-15 style carbine such as an M4 or an M16 and serve as a handguard as well as a mounting platform for various accessories such as telescopic sights, illuminators, and forward handgrips, for example.

The discussion above is merely provided for general background information and is not intended to be used as an aid in determining the scope of the claimed subject matter.

SUMMARY OF THE INVENTION

An eccentric rail mounting system is hereby provided. In various embodiments, this system comprises an eccentric rail nut for off-center mounting of a rail on a firearm. The eccentric rail nut has an exterior surface that defines a central axis of the nut, and a main bore that defines a central axis of the main bore that is displaced from the central axis of the nut. Components and methods are provided in a variety of embodiments.

In one embodiment, a nut is provided comprising:
an exterior surface, defining a central axis of the nut;
a main bore, defining a central axis of the main bore that is displaced from the central axis of the nut.

In another embodiment, the nut can further comprise an auxiliary (or second) bore of smaller diameter than the main bore, wherein the auxiliary bore can comprise a generally cylindrical auxiliary bore wall 107 and a generally cylindrical, forward section auxiliary bore wall 105.

In another embodiment, the main internal bore can comprise screw threading that accommodates a screw-on connection with a collar of an upper receiver and with a retaining nut.

In another embodiment, the external surface of the nut can comprise screw threading that accommodates a screw-on connection for a rail.

A method for mounting a rail to an upper receiver is also provided, the method comprising the steps of:
securing an eccentric rail nut to the upper receiver;
securing the barrel to the eccentric rail nut; and
securing the rail to the eccentric rail nut.

In one embodiment, the method can comprise, prior to the step of securing the rail to the eccentric rail nut, the steps of:
disposing at least one operating system component through an auxiliary bore in the eccentric rail nut; and
securing the at least one operating system component to the upper receiver and the barrel.

An eccentric rail mounting system comprising the eccentric rail nut is also provided.

In one embodiment, the eccentric rail mounting system can further comprise at least one of:
an upper receiver,
a barrel, or
a rail, wherein the rail is secured to the eccentric rail nut.

In another embodiment, the barrel can comprise a barrel extension.

In another embodiment, the barrel extension can comprise an aperture for receiving a locking pin.

In another embodiment, the eccentric rail mounting system can comprise a barrel retaining nut.

In another embodiment, the eccentric rail nut of the eccentric rail mounting system can further comprise an auxiliary (or second) bore of smaller diameter than the main bore, wherein the auxiliary bore comprises a generally cylindrical auxiliary bore wall 107 and a generally cylindrical, forward section auxiliary bore wall 105, and the barrel retaining nut can comprise a plurality of scallops around the forward portion of the exterior surface, wherein one scallop of the plurality is capable of aligning with the forward section auxiliary bore wall, thereby cooperating with the forward section auxiliary bore wall in forming a complete cylindrical interior wall surrounding a space interior to forward section auxiliary bore wall.

This Summary is intended only to provide a brief overview of subject matter disclosed herein according to one or more illustrative embodiments, and does not serve as a guide to interpreting the claims or to define or limit the scope of the invention.

BRIEF DESCRIPTION OF THE DRAWINGS

For a further understanding of the objects of the various illustrative embodiments, reference will be made to the following detailed description which is to be read in connection with the accompanying drawings.

FIG. 3 depicts an eccentric rail mounting system in an exploded perspective view, in accordance with an illustrative embodiment.

FIG. 4 depicts an eccentric rail mounting system in an assembled perspective view, in accordance with an illustrative embodiment.

The drawings are not necessarily to scale, emphasis instead generally being placed upon illustrating the principles of various embodiments. In the drawings, like numerals are used to indicate like parts throughout the various views.

DETAILED DESCRIPTION OF THE INVENTION

Figure 1:
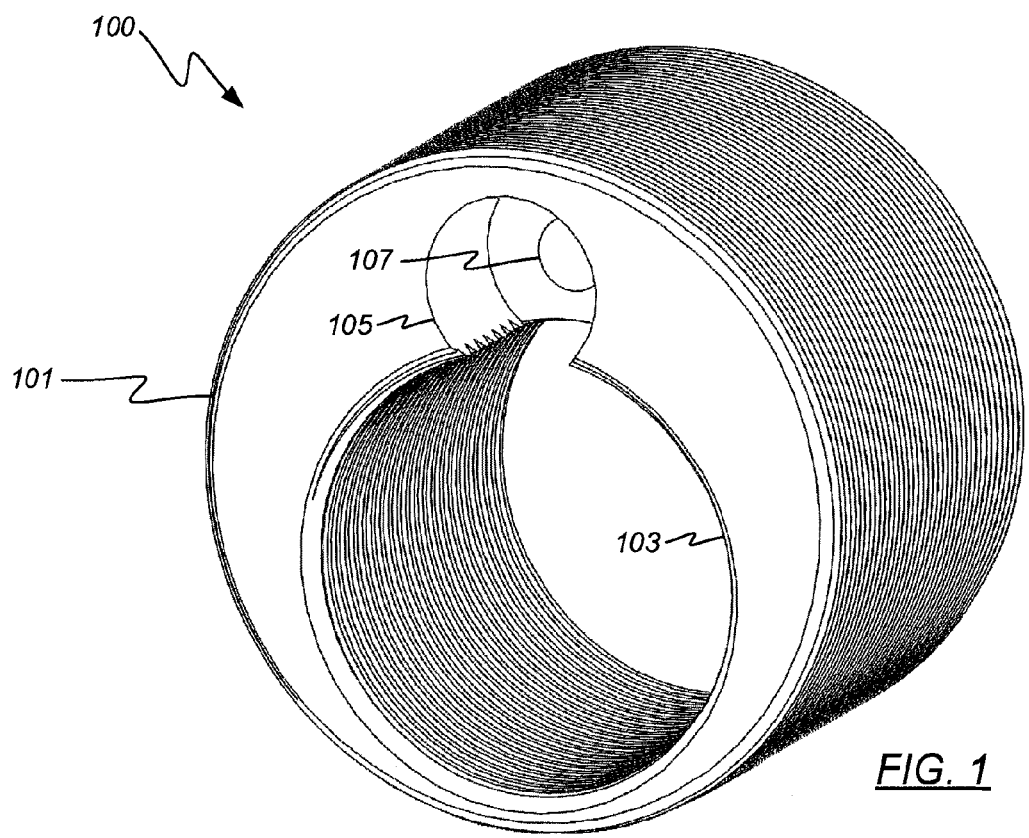
FIG. 1 depicts an eccentric rail nut in a perspective view, in accordance with an illustrative embodiment.

Illustrative embodiments of the eccentric rail system are set forth below.

In an illustrative embodiment, an eccentric rail system may comprise an eccentric rail nut that is configured to securely mount a rail in an off-center position relative to the barrel of a firearm, such as a carbine. This may allow additional space above the barrel within the rail, which may be useful for accommodating modifications to the operating system. For example, the operating system may be modified by installing an operating rod, in place of the typical gas tube of a carbine, for operating the bolt carrier, for example. In other examples, other modifications to the gas tube could be made that require more clearance space between the barrel and the rail.

In an illustrative embodiment, an eccentric rail nut may have a main internal cylindrical bore that is off-center relative to the exterior cylindrical surface. The nut thereby forms a cylindrical wall that is thicker on one side of the main internal bore and thinner on the other side of the main internal bore. The main internal bore has screw threading that may accommodate a screw-on connection with a collar of an upper receiver, and with a retaining nut that secures the base of the barrel. The external surface of the rail nut also has screw threading that may accommodate a screw-on connection for a rail. The thicker section of the cylindrical wall of the nut also has a second internal bore of narrower diameter that may accommodate carbine modification components such as an operating rod, or a gas tube modification, for example.

In this illustrative embodiment, when the eccentric nut is installed on the upper receiver, the thicker-walled section of the nut, where the second internal bore is positioned, is oriented above or upward of the main internal bore of the nut, so that the second bore may be aligned with an operating system aperture above the collar on the forward surface of the upper receiver. A barrel retaining nut may be screwed into the main bore of the rail nut for retaining a barrel. A barrel may be secured by the barrel retaining nut, for example. As another example, a barrel extension may be secured by the retaining nut, and the barrel secured to the barrel extension.

Because the rail nut is eccentric, i.e., has its main internal bore defining a central axis that is off-center from the central axis defined by the exterior cylindrical wall of the rail nut, the eccentric rail nut provides extra clearance space above the barrel between the barrel and the rail. This extra clearance space may accommodate additional components that may not fit within the space between the barrel and the rail when the rail is mounted concentrically with the barrel, and without having to resort to a non-standard rail or alternative handguard and mounting system, since standard Picatinny (mil spec 1913) rails are commonly used and often regarded as a must-have.

These illustrative objectives and advantages are served by features of various embodiments as further described below.

Figure 2:
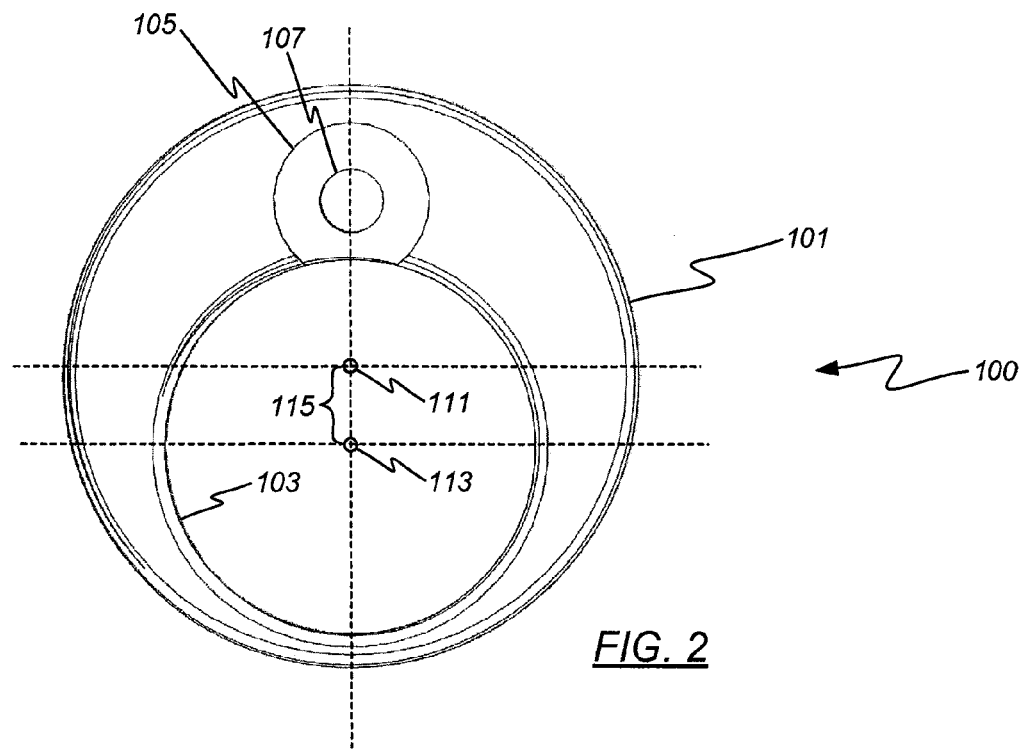
FIG. 2 depicts an eccentric rail nut in a front plan view, in accordance with an illustrative embodiment.

FIG. 1 depicts an eccentric rail nut 100 in a perspective view, in accordance with an illustrative embodiment. FIG. 2 depicts eccentric rail nut 100 in a front plan view, in accordance with the same illustrative embodiment as FIG. 1. Eccentric rail nut 100 has a generally cylindrical exterior surface 101, and a main bore characterized by cylindrical main bore wall 103. Eccentric rail nut 100 has a second, auxiliary bore that is of smaller diameter than the main bore. The auxiliary bore has two sections in the illustrative embodiment of FIGS. 1 and 2. The main section of the auxiliary bore is defined by generally cylindrical auxiliary bore wall 107. The auxiliary bore also has a larger diameter forward section defined by generally cylindrical, forward section auxiliary bore wall 105.

As seen particularly in FIG. 2, exterior surface 101 defines a central axis 111 of eccentric rail nut 100, at the center of the exterior cylindrical wall, equally distant from all parts of the exterior cylindrical wall. The internal main bore wall 103 defines a central axis 113 of the main bore, equally distant from all parts of the internal main bore wall 103 that is parallel to and displaced from the central axis of eccentric rail nut 100 as defined by exterior surface 101. Main bore central axis 113 is therefore at a displacement 115 from central axis 111 defined by the exterior surface 101 of eccentric rail nut 100.

Figure 5:
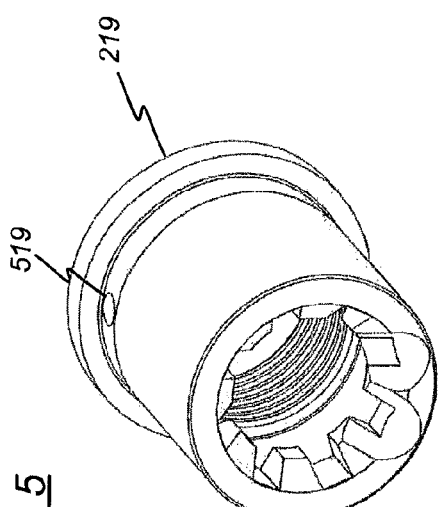
FIG. 5 depicts a barrel extension in a perspective view, in accordance with an illustrative embodiment.

FIG. 3 depicts an eccentric rail mounting system 200 in an exploded perspective view, in accordance with an illustrative embodiment that incorporates eccentric rail nut 100 in accordance with the illustrative embodiment of FIGS. 1 and 2. FIG. 4 depicts eccentric rail mounting system 200 in an assembled perspective view, generally in accordance with the illustrative embodiment of FIG. 3, though rail 242 is depicted only in FIG. 3, and not all reference numbers are in both figures. Eccentric rail mounting system 200 comprises upper receiver 201 and barrel 211, such as may be part of an M4 carbine. Barrel 211 has a gas port 213, a base 215 for mounting a front sight (not depicted here), and a muzzle 217. A gas block and a muzzle break (not depicted here) may be mounted on gas port 213 and muzzle 217, respectively. In an illustrative manner of usage, a front sight and/or muzzle break may be mounted to barrel 211 after rail 242 is secured to eccentric rail nut 100. Barrel 211 also incorporates barrel extension 219, in this illustrative embodiment. FIG. 5 depicts barrel extension 219 in a perspective view, in accordance with the illustrative embodiment of FIGS. 3 and 4. As depicted in FIG. 5, barrel extension 219 comprises aperture 519 for receiving a locking pin, in this illustrative embodiment.

Eccentric rail mounting system 200 also incorporates eccentric rail nut 100 and barrel retaining nut 221, in this illustrative embodiment. The exploded view of FIG. 3 suggests an order of assembly of the various components. Barrel 211 with barrel extension 219 may be fitted into upper receiver 201, then eccentric barrel nut 100 may be slid over barrel 211 and screwed onto a threaded collar of upper receiver 201, thereby securing eccentric barrel nut 100 to upper receiver 201. Barrel retaining nut may then be slid over barrel 211 and screwed into the threaded main bore of eccentric rail nut 100, and the barrel 211 secured to eccentric rail nut 100. Rail 242 may then be slid over barrel 211 and screwed onto the threaded exterior surface of eccentric rail nut 100, thereby securing rail 242 to the eccentric rail nut 211.

Rail 242 thereby becomes eccentrically mounted onto upper receiver 201, with extra clearance space above barrel 211 between barrel 211 and rail 242. Such extra clearance space above barrel 211 may be useful for accommodating a wide variety of equipment in the space above barrel 211 that may not fit between barrel 211 and rail 242 in a typical, concentrically mounted system in which rail 242 is mounted concentrically with barrel 211. For example, a variety of operating system components, such as an operating rod and/or an operating rod guide, may be incorporated in the space above barrel 211 and in association with gas port 213.

Figure 6:
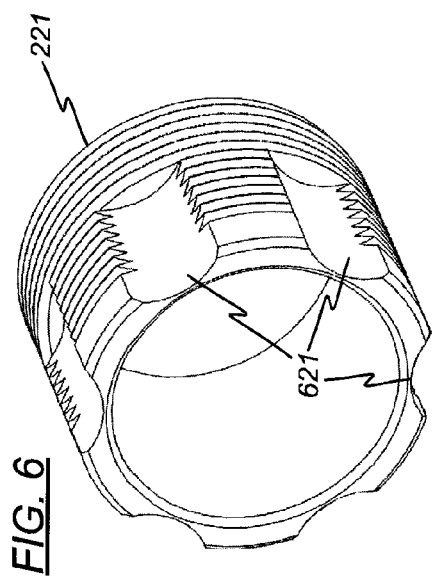
FIG. 6 depicts a barrel retaining nut in a perspective view, in accordance with an illustrative embodiment.

FIG. 6 depicts barrel retaining nut 221 in a perspective view, in accordance with the illustrative embodiment of FIGS. 3 and 4. As shown in FIG. 6, barrel retaining nut 221 has a series of scallops 621 around the forward portion of the exterior surface. Referring again to FIG. 4, it is seen that one of the scallops 621 on barrel retaining nut 221 is aligned with the forward section auxiliary bore wall 105 in eccentric rail nut 100, thereby cooperating with forward section auxiliary bore wall 105 in forming a complete cylindrical interior wall surrounding the space interior to forward section auxiliary bore wall 105. This space interior to the forward section of the auxiliary bore may be used for receiving or connecting with a component disposed above the barrel 211 between barrel 211 and rail 242. For example, an operating rod guide (not depicted) may be installed between the forward section auxiliary bore wall 105 and a gas block (not depicted) positioned above gas port 213, with an operating rod (not depicted) interior to the operating rod guide, and positioned to be disposed all the way through eccentric rail nut 100 through the full cylindrical auxiliary bore wall 107. An operating rod may thereby be operatively connected to a bolt carrier within upper receiver 201, for example. In another illustrative context of use, a gas tube may be disposed through auxiliary bore wall 107 to be operatively connected to a bolt carrier within upper receiver 201, for example.

Figure 7:
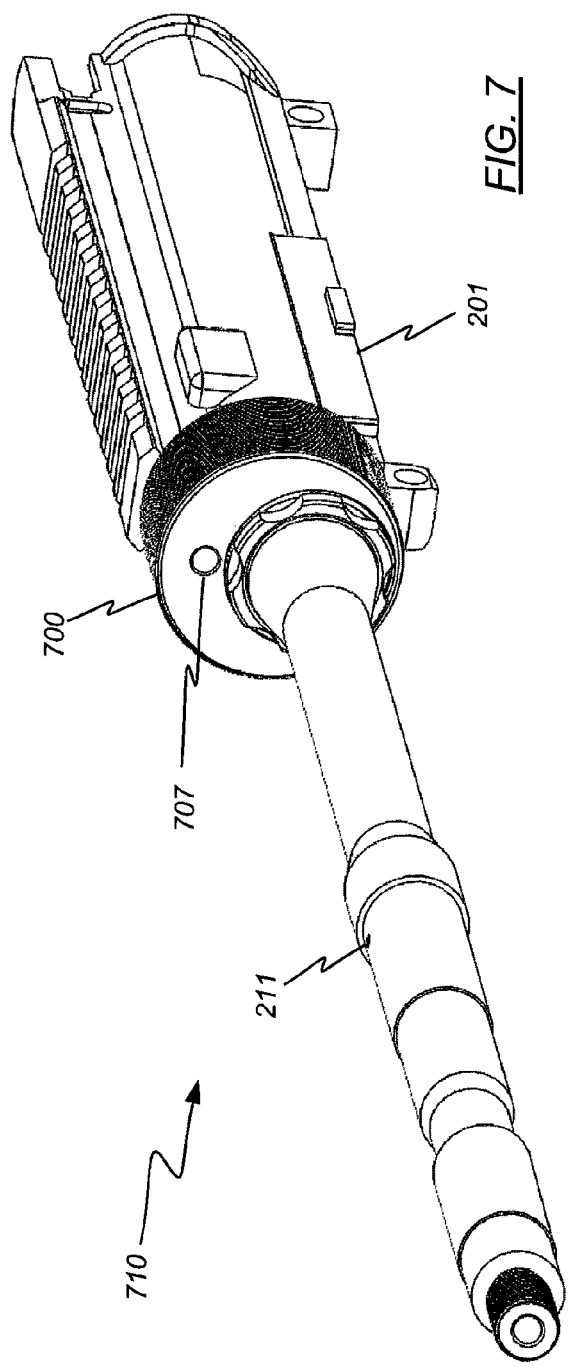
FIG. 7 depicts an eccentric rail mounting system in a perspective view, in accordance with an illustrative embodiment.

FIG. 7 depicts an eccentric rail mounting system 710 in a perspective view, in accordance with another illustrative embodiment that incorporates eccentric rail nut 700, in accordance with a different illustrative embodiment. Eccentric rail mounting system 710 is otherwise the same, in that it still incorporates upper receiver 201, barrel 211, and other features in common with the embodiment of FIGS. 3 and 4. Eccentric rail nut 700 also incorporates an eccentrically disposed main bore, and a smaller auxiliary bore wall 707, where auxiliary bore wall 707 is of the same diameter throughout the length of eccentric rail nut 700. Auxiliary bore wall 707 may be of a similar diameter to auxiliary bore wall 107 of the embodiment of FIGS. 1-4, while the auxiliary bore of the embodiment of FIG. 7 does not have a separate, larger diameter forward section comparable to that defined by forward section auxiliary bore wall 105 of the embodiment of FIGS. 1-4.

Auxiliary bore wall 707 may be useful for accommodating various components, such as an operating rod or a gas tube, in configurations that do not require a larger diameter forward section of the operating system bore. Any of a wide variety of additional configurations may also be used in other embodiments, for eccentric main bores at various displacements and positions relative to the exterior wall of the eccentric rail nut, and for auxiliary bores having various diameters, sectional configurations, and displacements from the main bore.

Figure 8:
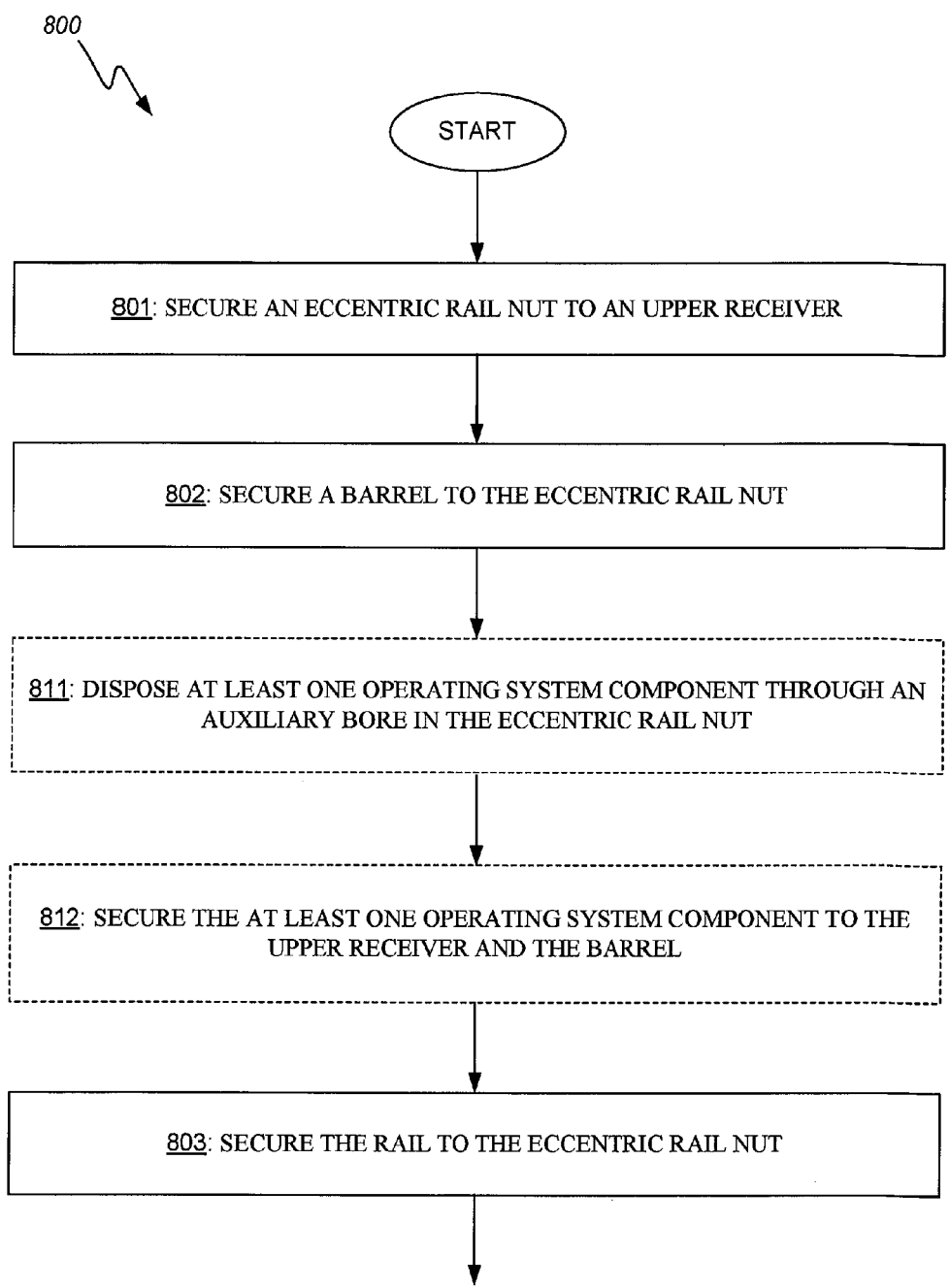
FIG. 8 depicts a flowchart for a method of eccentrically mounting a rail, in accordance with an illustrative embodiment.

FIG. 8 depicts a flowchart for a method 800 of eccentrically mounting a rail, in accordance with an illustrative embodiment, compatible with the mode of assembly of the various components depicted in FIGS. 3 and 4, for example. Method 800 comprises step 801, of securing an eccentric rail nut to an upper receiver; step 802, of securing the barrel to the eccentric rail nut; and step 803, of securing the rail to the eccentric rail nut. Method 800 may also comprise, between steps 802 and 803, step 811, of disposing at least one operating system component through an auxiliary bore in the eccentric rail nut; and step 812, of securing the at least one operating system component to the upper receiver and the barrel, prior to step 803 of securing the rail to the eccentric rail nut.

While various embodiments have been particularly shown and described, it will be understood by those skilled in the art that various combinations of the disclosed elements or changes in detail may be made without departing from the scope of the claims. For example, any of the engaging means between any of a barrel nut, a retaining nut, a locking ring, a barrel extension, a barrel, an upper receiver, an operating rod, an operating rod guide, and/or a gas tube, may be of or may comprise any of various types such as mated screw threading, snapping elements, an opposing tab and slot combination, nuts and bolts, extension pins, or other engaging elements. As another example, while embodiments are described and depicted in which a retaining nut and barrel extension are used and may be involved as mating elements between the rail nut and the barrel, in other embodiments, a rail nut may interface with the barrel without a retaining nut and/or barrel extension, or with different forms of retaining nut, or with additional mating elements, for example. As other examples, the auxiliary bore through the rail nut may be of a wide variety of different sizes, shapes, and placement positions; the auxiliary bore and main bore through the eccentric barrel nut may have a central axis with any of a range of values of displacement from the central axis defined by the cylindrical exterior surface of the eccentric barrel nut; and the eccentric barrel nut may have additional bores or other features. Other variations may also be made within the realm of different embodiments, limited only by the scope of the claims as recited below.

What is claimed is:

1. A nut comprising:
   an exterior surface, defining a central axis of the nut;
   a main bore, defining a central axis of the main bore that is displaced from the central axis of the nut; and
   wherein the external surface of the nut comprises a screw threading that accommodates a screw-on connection for a rail.

2. The nut of claim 1, further comprising an auxiliary (or second) bore of smaller diameter than the main bore, wherein the auxiliary bore comprises a generally cylindrical auxiliary bore wall 107 and a generally cylindrical, forward section auxiliary bore wall 105.

3. The nut of claim 1, wherein the main internal bore comprises screw threading that accommodates a screw-on connection with a collar of an upper receiver and with a retaining nut.

4. An eccentric rail mounting system comprising the nut of claim 1.

5. The eccentric rail mounting system of claim 4 comprising at least one of:
   an upper receiver,
   a barrel, or
   a rail, wherein the rail is secured to the nut.

6. The eccentric rail mounting system of claim 5 wherein a barrel comprises a barrel extension.

7. The eccentric rail mounting system of claim 6 wherein the barrel extension comprises an aperture for receiving a locking pin.

8. The eccentric rail mounting system of claim 4 comprising a barrel retaining nut.

9. The eccentric rail mounting system of claim 8 wherein the nut of claim 1 further comprises an auxiliary (or second) bore of smaller diameter than the main bore, wherein the auxiliary bore comprises a generally cylindrical auxiliary bore wall 107 and a generally cylindrical, forward section auxiliary bore wall 105, and wherein the barrel retaining nut comprises a plurality of scallops around the forward portion of the exterior surface, wherein one scallop of the plurality is capable of aligning with the forward section auxiliary bore wall, thereby cooperating with the forward section auxiliary bore wall in forming a complete cylindrical interior wall surrounding a space interior to forward section auxiliary bore wall.

10. An eccentric rail mounting system comprising:
    a nut comprising:
       an exterior surface, defining a central axis of the nut;
       a main bore, defining a central axis of the main bore that is displaced from the central axis of the nut;
    wherein said eccentric rail mounting system comprises a barrel, wherein said barrel is secured to the nut;
    wherein said barrel comprises a barrel extension; and
    wherein the barrel extension comprises an aperture for receiving a locking pin.

11. The eccentric rail mounting system of claim 10 comprising a barrel retaining nut.

12. The eccentric rail mounting system of claim 8 wherein the nut of claim 11 further comprises an auxiliary (or second) bore of smaller diameter than the main bore, wherein the auxiliary bore comprises a generally cylindrical auxiliary bore wall 107 and a generally cylindrical, forward section auxiliary bore wall 105, and wherein the barrel retaining nut comprises a plurality of scallops around the forward portion of the exterior surface, wherein one scallop of the plurality is capable of aligning with the forward section auxiliary bore wall, thereby cooperating with the forward section auxiliary bore wall in forming a complete cylindrical interior wall surrounding a space interior to forward section auxiliary bore wall.

\* \* \* \* \*